March 24, 1959
W. B. MAGRATH ET AL
2,878,935
METHOD AND APPARATUS FOR THE CONTINUOUS
PURIFICATION OF LIQUIDS
Filed Nov. 2, 1955
2 Sheets-Sheet 1
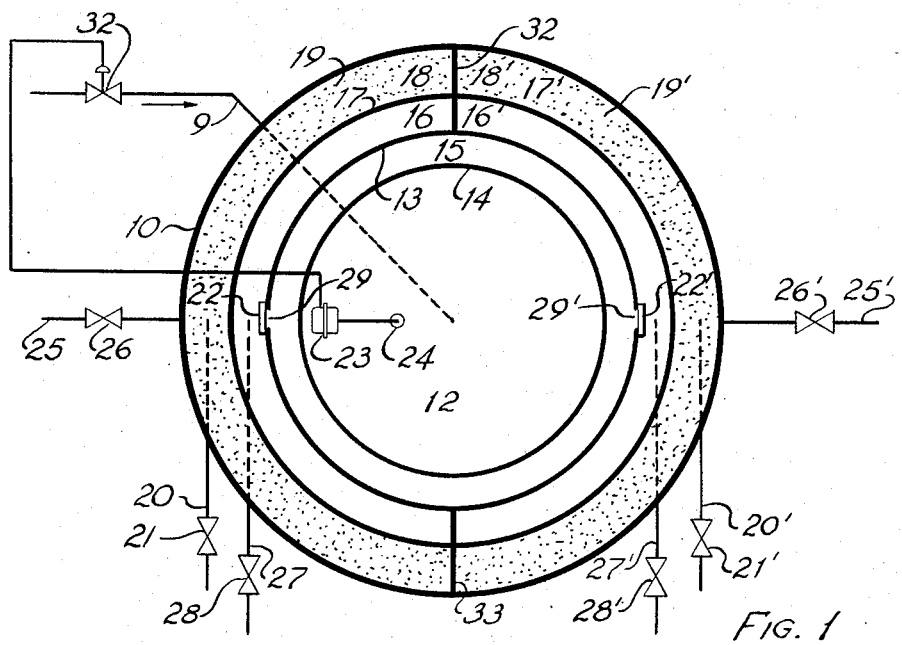
FIG. 1
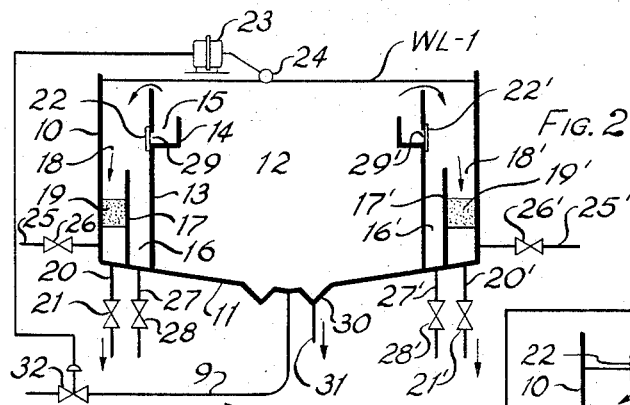
FIG. 2
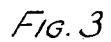
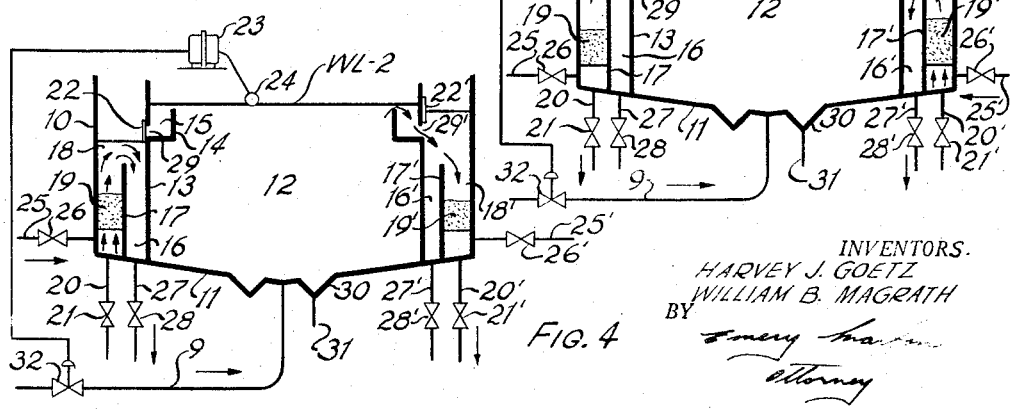
FIG. 3
FIG. 4
INVENTORS.
HARVEY J. GOETZ
WILLIAM B. MAGRATH
BY
Attorney

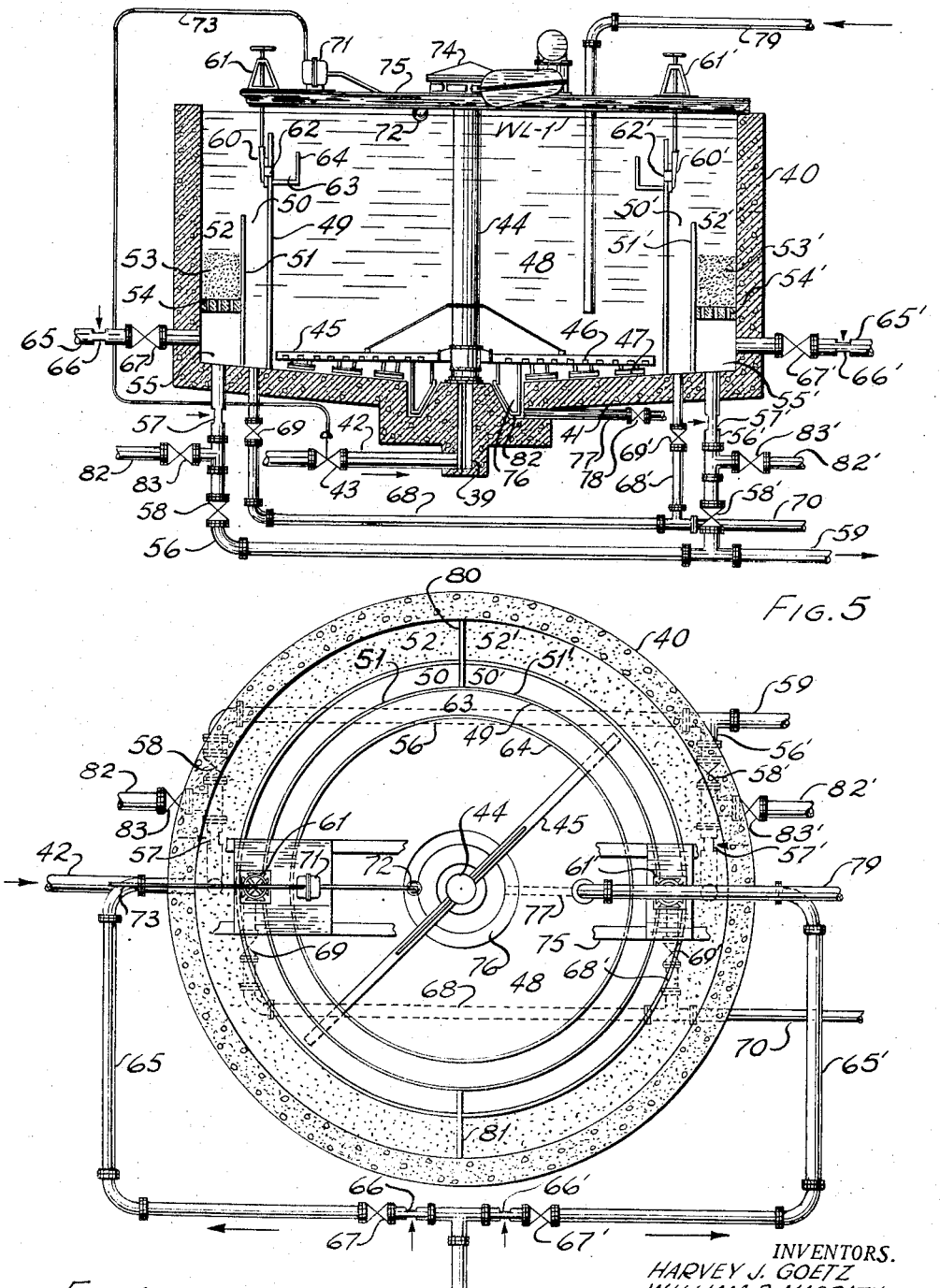

United States Patent Office 2,878,935
Patented Mar. 24, 1959

2,878,935

METHOD AND APPARATUS FOR THE CONTINUOUS PURIFICATION OF LIQUIDS

William B. Magrath and Harvey J. Goetz, Stamford, Conn., assignors to Dorr-Oliver Incorporated, Stamford, Conn., a corporation of Delaware Application November 2, 1955, Serial No. 544,542

18 Claims. (Cl. 210—82)

This invention relates to a method and means for treating impure liquids. More particularly, it relates to a method and means for achieving continuous treatment of such liquids in a dual purpose apparatus which includes means for the removal of suspended solid impurities by gravity filtration. Still more particularly, this invention relates to a method and means for adapting to a continuous operation, liquid treating apparatus of the type wherein a marginally disposed filter surrounds a central pretreatment section, said pretreatment section serving to flocculate and settle, or otherwise pretreat the liquid prior to filtration. While this invention is directed primarily toward water treatment, and the description contained herein is so limited for illustrative purposes, it should be recognized that the said method and means is also applicable to the treatment of polluted liquids such as sewage and industrial waste.

Among the various techniques for purifying water for domestic and industrial purposes, one of the most common is sand filtration. Sand filtration technique may be further classified into two classes of treatment, commonly known to the art as slow sand filtration and rapid sand filtration. As is suggested by the names of these classes, slow sand filtration involves the relatively slow percolation of water through sand beds at dosing rates in the order of magnitude of four million gallons per acre per day. During the course of this percolation the water is purified by reason, not only of mechanical filtration, but also by the bacterial action of micro-organisms contained in the so-called "schmutzdecke" or the zoogloeal layer formed in the uppermost levels of the sand bed. In rapid sand filtration on the other hand, no bacterial "schmutzdecke" is formed, but instead the water is subjected to coagulation and generally to settlement prior to filtration, and fine flocculant matter resulting from the said coagulation treatment is trapped in the upper portion of the sand bed. This flocculant matter, generally referred to in the art simply as "floc," contains a large portion of the impurities originally present in the water. Consequently, the retention of the floc by the sand bed acts to purify the water which passes through the bed. As floc accumulates in the sand bed, the flow-through capacity of the bed is, of course, gradually reduced, and the bed must be cleaned. This is generally accomplished by reversing the direction of flow through the bed, or "backwashing"; the wash water serving to agitate the bed and to carry off to waste the accumulated impurities. It is with this latter form of water treatment, or namely, rapid sand filtration, that this invention is, in part, concerned.

The large majority of rapid sand filtration installations in operation at present include, as part of their equipment, one or more pretreatment units, the partially treated effluents of which are transported to one or more functionally and structurally separate filters. There are also units which combine both kinds of apparatus into a single structure thus achieving major savings in space and cost. It may be observed, however, that, even in the combined units, if treatment is to be continuous in order to meet a continuing demand, at least two units must be constructed in order that during the cleaning or backwashing of one unit the other can continue to produce purified water. Backwashing is, incidentally, by common experience, generally required after roughly 24 hours of continuous operation, and generally takes from eight to fifteen minutes including flushing of the bed.

An alternative to supplying at least two of the combined units would, of course, be the provision of a single unit, but with extra filtered water storage facilities of sufficient capacity to furnish the quantity of wash water required to clean the entire plant filtering system at one time, and, in addition, to meet the demand for water while the filter is shut down for backwashing. If backwash pumps are used in lieu of elevated backwash storage, they must have sufficient capacity to clean the entire plant filtering system at one time.

It becomes apparent therefore, that very material benefits would accrue if a practicable and practical method and means were to be devised whereby the filter bed of a combined pretreatment and filtration unit is adapted to operate continuously by reason of the fact that provisions are made for the backwashing of less than all of the filter bed while the remainder of the bed continues to furnish purified water. It is with just such a development that this invention is concerned.

Thus, it is an object of this invention to set forth a method and means whereby a single combined water pretreatment and filtration apparatus is capable of operating continuously despite the need for filter backwashing. It is a further object of this invention to achieve this end through the utilization of an apparatus characterized by the presence of marginally disposed filter beds surrounding generally centrally disposed pretreatment means.

These and other objects are achieved by providing methods and means for multilevel operation of the unit, whereby at an upper liquid surface operating level all of the filtering area of the unit is utilized, while at a lower level a portion of the filter may be taken out of service and cleaned while the rest of the filter continues in operation.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

In the drawings:

Figures 1 through 4 are schematic representations illustrating the method of operation taught by this invention. Thus, Figure 1 is a schematic plan view of an apparatus wherein the peripheral filter and backwash compartments are divided into two functionally separate units, while Figures 2, 3 and 4 are schematic elevations showing flow patterns under various operating conditions.

Figure 5 illustrates, in elevation view a preferred apparatus embodiment of this invention.

Figure 6 illustrates a preferred apparatus embodiment of this invention in plan view.

The apparatus of Figures 1 through 4 comprise a treatment unit defined by peripheral wall 10 and bottom 11. Disposed within the unit is an annular partition wall 13 enclosing a centrally disposed zone 12 which may be termed a pretreatment zone; said zone being provided with a central feed conduit 9 and a sludge sump 30 with a sludge discharge conduit 31. Partition wall 13 is of a lesser height than annular wall 10, and, as will be shown hereinafter, liquid pretreated in zone 12 may leave the said zone either by overflowing the upper edge of partition 13, or, when gates 22 or 22' are open, by overflowing the vertical inner wall 14 of launder 15 and passing through openings 29 or 29'.

Disposed within the annular space formed by peripheral wall 10 and partition wall 13, and concentric therewith is a second annular partition divided into two segments 17 and 17' by radial partitions 32 and 33, said second annular partition being of lesser height than said partition wall 13, and forming between itself and peripheral wall 10 annular filter chambers 18, and 18' of substantially identical dimensions and between itself and partition wall 13 annular wash water gullets 16 and 16' of substantially identical dimensions. Suitably supported filter beds 19 and 19' preferably of the rapid sand type, are disposed within said filter chambers 18 and 18' respectively. Purified liquid which has passed through the filter beds is discharged from the unit by means of conduit 20 with valve 21 in the case of filter chamber 18, and conduit 20' with valve 21' in the case of filter chamber 18'. Conduit 25 with valve 26 and conduit 25' with valve 26' serve, respectively to furnish wash water to the undersides of filter beds 19 and 19'. Wash water gullets 16 and 16' are drained, respectively, by conduit 27 with valve 28 and conduit 27' with valve 28'.

A dual range level controller 23 of any common type, but shown in the figures, as being actuated by float 24, is provided to selectively hold the liquid surface of the pretreatment tank contents at one of two levels. The first level WL-1, is, as shown in Figure 2, at an elevation above that of the upper edge of partition wall 13. The second level, WL-2, is, as shown in Figures 3 and 4, at an elevation below that of the upper edge of partition wall 13, but above the top edge of the vertical inner wall 14 of launder 15. The retention of the liquid surface at these two levels is achieved by means of control valve 32 in influent line 9 which receives appropriate mechanical, electrical, hydraulic or pneumatic signals from the controller 23, and increases or decreases the influent flow rate accordingly.

Before proceeding further, it is important to note that, while in each of the figures the units illustrated contain but two radial partitions forming but two filter chambers with associated wash water gullets, this invention is by no means so limited. With the addition of conduits, valves, gates, etc., corresponding to those shown for each of the illustrated filter chambers and gullets, any number of radial partitions may be used to form a corresponding number of functionally independent filtration sections. The two-section units shown in the drawings and described in these specifications are to be deemed as being merely exemplary of the invention.

The method of operation of the units shown in Figures 1 through 4 is as follows. Raw influent to be treated enters through conduit 9 with control valve 32; the rate of flow being, except at such times as the water surface over the pretreatment zone 12 is in transition between level WL-1 and WL-2, equal to the total filtering capacity of those filter beds which are not being washed. Considering first the operating conditions shown in Figure 2, conditions, incidentally which will prevail when all filters are in operation, it may be seen that gates 22 and 22' are closed, filtered water discharge valves 21 and 21' are open and wash water valves 26 and 26' are closed, as are also waste wash water discharge valves 28 and 28'. Level controller 23 is set, manually or automatically for the upper operating level WL-1, whereby the contents of zone 12, which may be undergoing pretreatment therein by flocculation, settlement, softening, or etc., is permitted to migratingly overflow the upper edge of partition wall 13 and then pass generally downwardly to and through filter chambers 18 and 18'. Filtered water is discharged from the unit by way of conduits 27 and 27' with associated valves 28 and 28'.

After a period of operation, the duration of which varies with the rate of filtration, the concentration of impurities in the liquid being treated etc., filters of the rapid sand type tend to become clogged and cleaning is required. This is generally accomplished by reversing the direction of flow through the bed, thereby expanding it and causing the solid impurities retained by the bed to be discharged therefrom. According to the method of operation of this invention the washing of a bed may be accomplished without interrupting the filtration processes being carried out in the remaining filter bed or beds.

The operating steps involved are as follows. Level controller 23 is set, either manually or automatically to its lower operating level. In response to a signal from or a mechanical force exerted by the level controller, control valve 32 is throttled back to allow passage of influent at a rate less than that of the combined capacity of the filter beds. As a result since filtration is meanwhile proceeding, the liquid level within the unit will gradually drop from WL-1 toward the lower level WL-2. After the level has started dropping, but prior to the time it reaches the top edge of partition wall 13, secondary access means allowing water from the pretreatment zone to reach the filter chamber or chambers not to be washed is opened. In the Figures 3 and 4 embodiments this secondary means comprises launder 15 ports 29 and 29' and gates 22 and 22'. Thus, as shown in Figure 3, if filter bed 19' is to be washed, the opening of this secondary access means comprises raising gate 22 thereby permitting pretreated liquid to flow over the vertical inner wall 14 of launder 15, and through port 29 into filter chamber 18. Once the liquid surface level in the pretreatment zone has fallen below the upper edge of partition wall 13 this is the only means whereby liquid to be filtered can reach chamber 18, while no additional liquid can thereafter reach chamber 18'. The liquid surface level of the pretreatment zone continues to fall until level WL-2 is reached, at which point it is held substantially constant by the level controller.

The liquid level in filter chamber 18' is allowed to continue to fall to some level above that of the top of the filter bed 19'; this latter limitation being necessary in order to avoid air entrainment within the bed. When it has dropped to a satisfactory elevation, valve 21' is closed, thereby cutting off the further discharge of filtered water by way of conduit 20'. Valves 26' and 28' are then opened, whereby backwash water is introduced below filter bed 19' by way of conduit 25'; rises upwardly through the bed, overflows intermediate partition wall 17', passes downwardly through wash water gullet 16' and is discharged to waste by way of conduit 27'.

When the washing cycle is completed, the flow of backwash water through conduit 25' is cut off by closing valve 36'. After wash water gullet 16' had drained, valve 28' is also closed. Level controller 23 is manually or automatically reset for its upper operating position WL-1 and proceeds to bring about the raising of the liquid level by increasing the opening of control valve 32, and thereby permitting the flow through conduit 9 to exceed the filtering capacity of the filter or filters still in operation. As soon as the liquid level of the pretreatment zone 12 reaches the top of partition wall 13 gate 22 may be shut. Pretreated liquid then commences to overflow the said wall refilling filter chamber 18'. Valve 21' is then opened permitting the passage of liquid through conduit 20'. When level WL-1 is reached it is held there by the level control 23, and the unit is back in operation with all filters functioning. If rinsing of the newly washed filter bed is desired, it can be accomplished by the simple expedient of allowing the first part of the flow through the filter to discharge to waste.

Figure 4 has been included simply to show that the method of operation as described above for washing filter bed 19' applies equally to the washing of filter bed 19 or any other filter sections which may be present by the proper manipulation of the corresponding valves and gates.

It is important to note in the foregoing that by following the teachings of this invention it is possible to utilize a single combined pretreatment and filtration unit to provide a continuous flow of filtered water even during periods when one or more portions of the total filtering material available is being washed. It should be further noted that this end is achieved without sacrificing during normal operations when no filters are being washed, the advantage of having the flow pass from the pretreatment zone to the filter chambers by non-turbulently overflowing a submerged wall, namely partition wall 13, the liquid level over the filter chamber being, under these conditions, common with that over the pretreatment zone.

Figures 5 and 6 represent an apparatus embodiment incorporating features which adapt it for operation according to the method teachings of this invention. Figure 6 is a plan view of the Figure 5 apparatus but with the location of some of the piping modified for clarity of illustration. The unit shown comprises a tank with peripheral wall 40 and bottom 41. Liquid to be treated enters by way of influent pipe 42 with control valve 43 and after passing through riser 39 enters hollow distributing arms 45. The distributor arms are provided with slots or orifices 46 whereby liquid entering the arms 45 is discharged into the central zone 48 of the treatment unit. In order to assure the uniform distribution of the influent flow over the entire horizontal cross-section of the zone 48 means are provided for rotating the distributor arms about the central vertical axis of the unit; the said rotating means comprising drive mechanism 74 mounted on bridge 75 and mechanically linked to shaft 44 which is, in turn, fixedly attached to the inner termini of the distributor arms. The distributor arms are additionally provided with sludge rakes 47 fixedly mounted on the underside thereof and serving to transport settled solids to annular sludge sump 76. In order to thicken the sump solids prior to their discharge by way of pipe 77 with valve 78, thickening blades such as those illustrated at 82 may be provided extending downwardly from said rotating distributor arms 45 into said sump 76.

The aforementioned zone 48 comprises in this case a pretreatment zone wherein flocculation, settlement, softening or etc. may take place. It is peripherally defined by an annular peripheral partition wall 49 concentric with the outer wall 40, but extending upwardly from the tank bottom to an elevation less than that of the top of said outer wall, and spacedly disposed therefrom in an inwardly direction. A second annular partition wall is disposed between said annular partition wall 49 and outer wall 40. This second annular partition wall is divided, by means of radial partitions 80 and 81 shown in Figure 6, into two segments 51 and 51' each of which are semicircular. While it could not be conveniently shown in the drawings, it should be noted that said radial partitions 80 and 81 are sealingly in contact with the tank bottom and with walls 40, and 49 and extend upwardly to an elevation to which the level of liquid surface of the pretreatment zone 48 is permitted to fall.

The second partition wall segments form, between themselves and outer wall 40, a plurality of filter chambers corresponding to the number of second partition wall segments present. Thus, in the instant case, filter chamber 52 is formed between second partition wall segment 51 and outer wall 40, and filter chamber 52' is formed between second partition wall segment 51' and outer wall 40. In like manner, the second partition wall segments form chambers between themselves and partition wall 49. Thus, segment 51 forms chamber 50 cooperatively with wall 49, while segment 51' forms chamber 50' cooperatively with wall 49. Chambers 50 and 50' comprise wash water gullets serving, during the backwashing of the filters as hereinafter described, to collect used wash water and discharge it to waste by way, respectively, of pipe 68 with valve 69 and pipe 68' with valve 69', said pipes discharging ultimately into wash water disposal pipe 70.

Disposed within filter chambers 52 and 52' are filter beds 53 and 53' respectively resting on porous supporting means 54 and 54'. The preferred filter beds are of the common rapid sand type through which the liquid passes downwardly during regular filtration and which is cleaned by reversing the direction of flow therethrough and thereby expanding the bed sufficiently to discharge entrained solid impurities. The opening through the porous supporting means or underdrains 54 and 54', which may, incidentally, comprise any of the commonly used materials or devices including porous diffusor plates, perforated metal or etc., serve as hydraulic communicating means between the filter beds 53 and 53' and their respective underdrain chambers 55 and 55'. Consequently, during filtration, filtrate passes downwardly through the underdrain means 54 and 54', enters underdrain chambers 55 and 55' and passes thence to and through effluent pipe 56 and 56' with associated valves 58 and 58'; said pipes merging ultimately into effluent pipe 59. It may be noted that effluent pipes 56 and 56' are each equipped with rate of flow controllers 57 and 57' respectively. The utilization of flow controllers on the discharge of rapid sand filters to hold the rate of filtration constant conforms to general modern practice in the art; it having been found that variations in filtration rate significantly and detrimentally affect the efficiency of filtration. The controller functions by exerting a throttling effect when a newly cleaned bed goes into operation at which time the filtration rate tends to be excessively high, and by gradually reducing the throttling as the filter bed commences to clog. Pipe 82 with valve 83 and pipe 82' with valve 83' are rinse discharges provided to allow the passage to waste of backwash water flushed from the filter beds during the first few minutes of operation following a cleaning of a bed.

Wash water is supplied to the filters through pipes 65 and 65' with valves 67 and 67' respectively. These pipes discharge into filter chamber 55 and 55' whence wash water passes upwardly through porous underdrains 54 and 54' during backwashing. It may again be seen that pipes 65 and 65' are fitted with rate of flow controllers 66 and 66' respectively. Control of wash water rate is generally deemed necessary in the design of rapid sand filters since the rate of flow which will produce adequate expansion and cleaning of the sand bed, but which is less than that at which sand would be blown out of the bed completely is rather critical. While each of the wash water lines in the Figures 5 and 6 embodiment is separately equipped with a rate controller, it is evident that, if desired, a single controller may be placed in a main wash water line feeding each of the individual filter backwash pipes.

The upper portion of partition wall 49 is fitted with a launder 63 extending into pretreatment zone 48, the upper edge of the inner wall 64 of said launder comprising a weir over which pretreated liquid passes during backwashing of one of the filters as hereinafter described. There are, additionally, openings 62 and 62' in partition wall 49 disposed at a level at or slightly above the bottom of launder 63. During normal operations both these openings are closed by means of gates 60 and 60' respectively; said gates being raised or lowered by means of valve stands 61 and 61' mounted on bridge 75.

Also mounted on bridge 75 is a dual range level controller 71, shown in this case, for illustrative purposes, as utilizing a float 72 as the level sensing means for ascertaining the surface level of the pretreatment zone contents. While the controller may be of any one of the common types, in this case it is shown as being of the type which generates pneumatic signals which are transmitted by line 73 to a diaphragm control valve 43 on influent line 42. By means of controller 71 the liquid level of pretreatment zone 48 may be selectively maintained at either of two levels; these being the level WL–1 shown in Figure 5 (and Figure 2), and a lower level WL–2 lying above the lip of the inner wall 64 of launder 63, but below the upper edge of partition wall 49. Level WL–2 is shown in Figures 3 and 4.

In some instances, it is necessary or desirable to add chemicals to the liquid undergoing treatment within the unit. Conduit 79, shown discharging directly into pretreatment zone 48, is provided for that purpose. It should be noted however that the presence and disposition of the chemical feed means is not intended as a limitation on this invention.

The method of operation of the Figures 5 and 6 embodiment may be described as follows.

Liquid to be treated enters the system by way of pipe 42 and at a rate determined by control valve 43. Passing upwardly through riser section 39, it enters rotating distributor arms 45. After passing through openings 46 in said distributor arms the liquid moves in a generally upward direction through pretreatment zone 48, during the course of which movement, and dependent upon the type of treatment being effected, chemicals may be, and generally are, added by way of pipe 79 and the liquid may be subjected to settlement and/or flocculation, and/or softening. Solids depositing on the bottom are transported by rakes 47 to centrally disposed sludge sump 76 and are intermittently or continuously discharged therefrom by way of pipe 77 with valve 78.

When both filters 53 and 53' are in operation, dual range level controller 71 would be set, manually or automatically, to hold the liquid surface of the pretreatment zone 48 at level WL–1 as shown in Figure 5. Consequently, the liquid treated in zone 48 is permitted to migrate over the top of partition wall 49 with minimum turbulence and minimum danger of break-up of suspended flocculent matter. Moving in a generally downward direction after passing over partition wall 49, the liquid enters filter compartments 52 and 52' and percolates through filters 53 and 53'; whereby solid impurities are stripped from the liquid. Filtered liquid emerging from the bottom of the filter bed passes through porous underdrain chambers 55 and 55' and flow from the unit through pipes 56 and 56' shown merging into a common discharge pipe 59. In addition to valves 58 and 58', pipes 56 and 56' are equipped with rate of flow controllers 57 and 57'. These effluent rate of flow controllers are as stated hereinabove, set in such a fashion that they will maintain a substantially constant rate of flow through each filter bed regardless of the degree of clogging thereof, an operational characteristic necessary for the proper functioning of the filtration operation.

It has been stated hereinabove that one of the principal objects of this invention lies in the provision of a method and means for achieving continuous filtration even during those periods when one or more portions of the over-all filter bed present in the unit is undergoing cleaning. The Figures 5 and 6 embodiment is adapted to achieve and achieves this end in the following manner. When one of the filter beds, which, for purposes of this discussion, will be assumed to be filter bed 53', requires cleaning, the dual range level controller 71 is reset, automatically or manually, for its lower operating level, whereat it will maintain the liquid surface of the pretreatment compartment at an elevation between that of the upper edge of launder wall 64 and the upper edge of partition wall 49. By a signal transmitted through line 73, control valve 43 is caused to throttle down to reduce the flow rate to a value below that of the sum of the unit filter sections, and the pretreatment zone level commences to drop to said lower level. Before the level has reached the top edge of partition wall 49, gate stand 61 is operated, manually or automatically to raise gate 60. As soon as the level has fallen below said top edge of partition wall 49, it may be observed that no additional liquid can enter filtration chamber 52'. As a result, while pretreated liquid can and does pass into launder 63, and thence, eventually, through opening 62 for filtration in filter bed 53, the level in filter chamber 52' continues to drop as liquid is withdrawn therefrom through filter bed 53'.

Some time before the falling liquid surface in chamber 52' reaches the top of the sand bed, valve 58' on filtered water effluent pipe 56' is closed. This step is followed by an opening of valve 69' in wash water drain pipe 68' and, simultaneously therewith or shortly thereafter, an opening of valve 67' on wash water supply line 65'. Wash water which enters underdrain chamber 55' at a rate established by rate of flow controller 66', passes upwardly through porous underdrain 54' and enters filter bed 53'. The upwardly flowing wash water causes said filter bed to expand and release solid impurities retained by it during the course of filtration. After emerging from the bed, the impurity-bearing wash water overflows partition wall 51' and enters wash water gullet 50' wherein it moves downwardly to discharge by way of pipe 68' with valve 69' and pipe 70.

After satisfactory cleaning of the filter bed has been achieved, it is returned to filtration as follows. Valve 67' in backwash line 65' is closed, and, after wash water gullet 50' has drained, valve 69' on wash water drain pipe 68' is closed. Dual range level controller 71 is reset for its upper operating level, resulting in the opening of control valve 43 and a gradual rise of the level in the pretreatment zone 48 toward WL–1. Gate 60 is closed when the level has reached the top of partition wall 49 and pretreated liquid commences to overflow said wall into the filter sections. At this point filter bed 52' may, if desired, be rinsed of wash water remaining in the system by opening valve 83' on rinse water discharge pipe 82' and leaving it open for a few minutes after filtration has resumed. After rinsing has been completed, or, in any event, when it is desired to return filter bed 53' to stream, valve 58' is open permitting water filtered through bed 53' to flow through pipe 56' and enter filtered water effluent line 59. As soon as the liquid level has returned fully to WL–1 the cycle is complete and entire unit is once again operating at full capacity as a pretreatment and filtration device.

We claim:

1. A multipurpose apparatus for treating impure liquids, in part by filtration, comprising a central zone defined laterally by a first peripheral partition wall, an annular intermediate zone defined by said first peripheral partition wall and a second partition wall of lesser height than said first partition wall and an annular filtration zone defined by said second partition wall and an outer wall of greater height than either of said partition walls, said filtration and intermediate zones being further subdivided into a plurality of sections by means of radial partitions therein, a bottom beneath said zones, feed inlet means discharging into said central zone, filtering means within each of said filtration zone sections, means for cleaning said filtering means, discharge means for withdrawing filtered liquid from each of said filtration zone sections, said first peripheral partition wall being adapted for the passage of liquid at at least two levels from said central zone to said filter zone sections, control means located at at least those locations where said first peripheral partition wall is adapted for the passage of liquid at the lowermost of said levels whereby the flow of liquid to each of said filter sections may be independently controlled; together with means for selectively maintaining the liquid surface of said central zone at at least two pre-determined levels, at least the uppermost level being at an elevation above those locations where said first peripheral partition wall is adapted for the passage of liquid at the uppermost of said levels and a lower level at an elevation between those locations where said first peripheral partition wall is adapted for the passage of liquid at the uppermost of said levels and those locations where said first peripheral partition wall is adapted for the passage of liquid at the lowermost of said levels.

2. Apparatus according to claim 1 wherein said first peripheral partition wall is adapted for the passage of liquid at the uppermost of said levels by means which comprise an annular submerged weir formed by the upper edge of said first partition wall and said first peripheral partition wall is adapted for the passage of liquid at the lowermost of said levels by means which comprise a plurality of openings in said first partition wall, said openings being at an elevation above that of the top of the filter beds contained therein, at least one opening being provided for each filtration section, together with closure means for said openings.

3. Apparatus according to claim 1 wherein said first peripheral partition wall is adapted for the passage of liquid at the lowermost of said levels by means which receive liquid to be filtered from an annular launder mounted on said first partition wall and projecting therefrom into said central zone, said launder being adapted to draw liquid from the central zone at such times as the liquid surface thereof is at its said lowermost level.

4. Apparatus according to claim 1 wherein said central zone comprises a pretreatment zone adapted to condition the liquid contained therein prior to filtration.

5. Apparatus according to claim 4 wherein additional means are provided for the introduction of chemicals to the liquid being treated prior to filtration thereof.

6. Apparatus according to claim 5 wherein said additional chemical introduction means comprises a conduit discharging directly into the central zone.

7. Apparatus according to claim 1 wherein said filtering means comprises a filter bed of the rapid sand type adapted for downward filtration therethrough and upward backwashing thereof.

8. Apparatus according to claim 1 wherein additional means are provided for the disposal of solids accumulating in said central zone.

9. Apparatus according to claim 8 wherein said additional means for the disposal of solids comprises a generally centrally disposed sludge sump with suitable pipe discharge means, together with rotating raking means, adapted to transport accumulated solids across the tank bottom to said sludge sump.

10. Apparatus according to claim 1 wherein said feed inlet means discharging into said central zone comprises a plurality of rotating distributing arms adapted, by means of openings therein, to distribute the feed substantially uniformly over the bottom of said inner compartment.

11. Apparatus according to claim 1 wherein said means for maintaining the liquid surface overlying said central zone at at least two pre-determined levels comprises a multi-range level controller adapted to be set for at least two pre-determined levels with float means for gaging the level of said surface, said level controller being functionally associated with a flow control valve mounted in said feed inlet means.

12. A multipurpose apparatus for treating impure liquids, in part by filtration, comprising a central pretreatment zone defined laterally by a first peripheral partition wall, an annular intermediate zone defined by said peripheral wall and a second partition wall of less height than said first partition wall, and an annular filtration zone defined by said second partition wall and an outer wall of greater height than either of said partition walls, said filtration and intermediate zones being further subdivided into a plurality of sections by means of radial partitions therein, a bottom beneath said zones, feed inlet means discharging into said central zone, wash liquid inlet means discharging into each of said filtration zone sections beneath a filter bed contained therein, overflow means comprising the upper edge of said second partition wall for transferring wash liquid from said filtration zone to said intermediate zone, discharge means for cleaning waste wash liquid from each of said intermediate zone sections, discharge means for withdrawing filtered liquid from each of said filtration zone sections; said apparatus being characterized by the provision of a dual range level controller operating to selectively maintain the liquid surface overlying said central zone at one of two predetermined levels, the upper level being at an elevation above that of the upper edge of said first partition wall, and the lower level being at an elevation below the upper edge of said first partition wall, but above the elevation of secondary unfiltered liquid introduction means provided for each of the plurality of filtration zone sections, whereby each of the filtration zone sections is adapted to receive pretreated liquid from the central zone independently of the flow of such liquid to any of the other filtration zone sections.

13. A method for the continuous filtration of impure liquids which comprises the steps of establishing and maintaining a body of such liquid undergoing treatment, establishing and maintaining a plurality of functionally independent filtering beds adjacent said liquid body, adjusting the level of said body at a first elevation to provide hydraulic communication between a surface proximate portion of said body and said filtering beds thereby permitting the flow of liquid from said body to said filtering beds, filtering the liquid which passes in said fashion to said filtering beds, taking a filtering bed which requires cleaning out of service, without interrupting filtration in the remaining beds, an operation consisting of the steps of lowering the surface level of said body to a second elevation whereby the hydraulic communication existing at said first elevation is disrupted, and establishing secondary hydraulic communication between the surface proximate portion of said body at its said lower level and those filtering beds not being washed, cleaning said bed which requires cleaning, and restoring all filtering beds to normal operation by raising the surface level of said body to said first elevation and ceasing the utilization of said secondary hydraulic communication.

14. A method according to claim 13 wherein said cleaning of the filtering bed which requires cleaning comprises the step of passing a wash liquid through said section in a direction reverse to that traveled by liquid during filtration.

15. A method according to claim 13 wherein said body of liquid is subjected to treatment by the addition of chemicals prior to filtration.

16. A method according to claim 15 wherein the chemically treated liquid body is gently stirred to promote coalescence and flocculation of solids contained therein.

17. A method according to claim 13 wherein, additionally, solids settling to the bottom of said liquid body are continuously removed therefrom.

18. A method for the continuous filtration of impure liquids which comprises the steps of establishing and maintaining a body of such liquid undergoing treatment adjacent to a plurality of independent filter beds, establishing hydraulic communication between said body and said filter beds by raising the surface level of said body to an elevation greater than that of a common separating means between said body and said beds whereby surface proximate liquid within said body is permitted to flow from said body to said filter beds, filtering said liquid which passes in said fashion to said filter beds, and backwashing clogged portions of the filter bed without interrupting filtration in the remainder of the bed;

which backwashing comprises lowering the surface level of said body to an elevation below that of said common separating means between said body and said beds, establishing secondary hydraulic communication between a surface proximate portion of said body and such portions of said bed as are not being backwashed, said secondary hydraulic communication being at a lower level than the first mentioned hydraulic communication stopping the flow of filtered liquid from the portion of the bed to be cleaned introducing backwash liquid below said portion of the filter bed to be cleaned and causing it to pass upwardly therethrough, disposing of used wash liquid, and returning the thus cleaned portion of the filter bed to stream by stopping the introduction and disposal of wash liquid, raising the surface level of said liquid body to an elevation greater than that of said common separating means between said body and said bed, thereby re-establishing hydraulic communication between said body and the entire filter bed, re-instituting filtration through that portion of the bed which has been cleaned, and ceasing the utilization of said secondary hydraulic communication.

References Cited in the file of this patent
UNITED STATES PATENTS

| | | |
|---|---|---|
| 2,246,224 | Streander | June 17, 1941 |
| 2,395,508 | Seddig | Feb. 26, 1946 |
| 2,411,390 | Prager | Nov. 19, 1946 |